United States Patent Office 3,499,890
Patented Mar. 10, 1970

3,499,890
CERTAIN OCTAHYDRO-1,12-TRIMETHYLENE-INDOLO[2,3-a]QUINOLIZINES
Robert Norman Schut, Edwardsburg, Mich., assignor to Miles Laboratories, Inc., Elkhart, Ind., a corporation of Indiana
No Drawing. Filed June 2, 1967, Ser. No. 643,065
Int. Cl. C07d 41/00; A61k 27/00
U.S. Cl. 260—239.3
10 Claims

ABSTRACT OF THE DISCLOSURE

A series of hexahydro- and octahydro-1,12-trimethyleneindolo[2,3-a]quinolizines that are useful as analgesics and monoamine oxidase inhibitors. The process for preparing the compounds includes the addition of α,β-unsaturated aldehydes or β,γ-unsaturated α-ketoesters to a suitable quinolizine to form an intermediate adduct. The intermediate adduct is then hydrogenated to prepare the octahydro form.

---

This invention relates to a series of 1,12-trimethyleneindolo[2,3-a]-quinolines. More particularly the invention relates to a series of hexahydro- and octahydro-1,12-trimethyleneindolo[2,3-a]quinolizines having beneficial pharmacological properties and a synthetic process for the preparation thereof.

Hexahydro - 1,12-trimethyleneindolo[2,3-a]quinolizines of this series may be represented by the general structural formula:

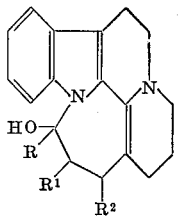

Wherein R is a member selected from the group consisting of hydrogen and carboalkoxy, $R^1$ is a member selected from the group consisting of hydrogen, and lower alkyl, and $R^2$ is a member selected from the group consisting of hydrogen, lower alkyl, and aryl.

Octahydro-1,12 - trimethyleneindolo[2,3-a]quinolizines of the series of this invention may be represented by the structural formula:

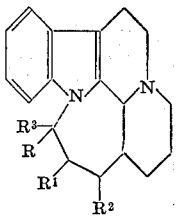

in which R is a member selected from the group consisting of hydrogen and carboalkoxy, $R^3$ is a member selected from the group consisting of hydroxy, methoxy and isopropoxy, or $RR^3$ is oxo, $R^1$ is a member selected from the group consisting of hydrogen and lower alkyl, and $R^2$ is a member selected from the group consisting of hydrogen and lower alkyl and aryl, and pharmacologically acceptable salts of said compounds.

The octahydro-1,12-trimethyleneindolo[2,3-a]quinolizines of this invention demonstrate beneficial pharmacological properties. They display utility as analgesics and are useful as monoamine oxidase inhibitors. Also with the process of the invention, compounds are prepared that are structurally related to eburnamine and vincamine alkaloids.

For pharmacological purposes, a free base form of the octahydro-1,12-trimethyleneindolo[2,3-a]quinolizines may be used. Preferably, however, these compounds are used in the form of pharmacologically acceptable, non-toxic, water-soluble, addition salts, for example, salts of mineral acids such as halogen acids or sulfuric acid or organic acids such as citric acid, maleic acid, oxalic acid and other similar acids. The preparation of these addition salts is described in the following detailed examples and will not, therefore, be set forth in this point.

Preparation of the hexahydro-1,12-trimethyleneindolo [2,3-a]quinolizines of the invention, which are used primarily as intermediates in the formation of octahydro-1,12-trimethyleneindolo[2,3-a]quinolizines according to the novel process of this invention, involves the addition of α,β-unsaturated aldehydes or β,γ-unsaturated α-ketoesters to 2,3,4,5,6,7,12-hexahydroindolo[2,3-a]quinolizines. This reaction proceeds according to the general equation:

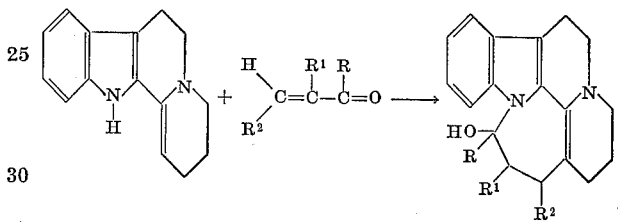

In this equation, R, $R^1$, and $R^2$ correspond with their previously described properties.

The operating conditions for this reaction are not considered critical. Preferably suitable solvents for the reactants are utilized, such as dry THF (tetrahydrofuran) for the quinolizine and benzene for the aldehyde or ester. Generally the reaction is carried out at room temperature, about 23° C., without the use of external temperature control equipment. Certain of the addition reactions may be slightly exothermic, however. Heat thusly generated is readily dissipated if the reactants are combined at a controlled rate. Chemical reaction and heat dissipation are further aided by stirring the solutions during their mixing. Stirring is advantageously continued after mixing the reactants for between about 1 and 3 hours, although this period is not considered critical and longer periods may be used.

Hexahydro - 1,12 - trimethyleneindolo[2,3-a]quinolizines are ready converted to more highly saturated octahydro - 1,12 trimethyleneindolo[2,3-a]quinolizines by a catalytic hydrogenation with appropriate solvents and catalysts. Hydroxy or alkoxy compounds having a structural formula:

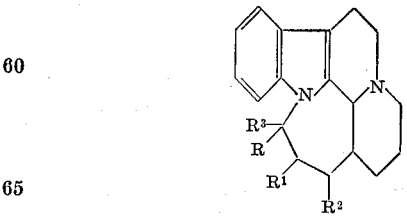

are produced by this reaction.

Solvents in which the hydrogenation reaction may be carried out include methanol, isopropyl alcohol and water. The reactants advantageously include an acid solution such as HCl or acetic acid in a solvent such as methanol, isopropyl alcohol or water. The reaction is promoted with a suitable catalyst, for example, PtO₂.

Although the operating conditions are not crucial, a temperature of about 23° C., (room temperature) and a pressure of about 50 p.s.i. are preferred for the hydrogenation. Beneficially the reaction mixture is agitated for between about 1 and 2 hours or longer.

A free base of the octahydro-1,12-trimethyleneindolo [2,3-a]quinolizine is conveniently formed by the addition of a base or basic solution to the above reaction mixture. Such base may include sodium hydroxide, sodium carbonate, sodium bicarbonate, or solutions thereof.

An octahydro - 1,12 - (γ-oxo)trimethyleneindolo[2,3-a] quinolizine having the structural formula:

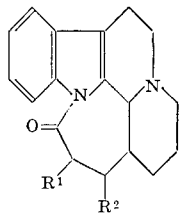

may be prepared by the oxidation of an octahydro-1,12-trimethyleneindolo[2,3-a]quinolizine in which R=hydrogen and R³=hydroxy. A suitable oxidizing reagent, such as a chromic acid or similar oxidizing agents may be utilized to prepare the oxo form.

The invention will be further understood by reference to the following examples which describe specific compounds of the invention and the processes for the preparation thereof. These examples are representative of some of the novel compounds and processes that constitute this invention and are not intended to limit the scope of the invention.

EXAMPLE I 1,12-(γ-hydroxy)trimethylene-2,3,4,6,7,12-hexahydroindolo[2,3-a]quinolizine (R=R¹=R²=H)

To a stirred solution of 22.4 g. (0.10 mole) of 2,3,4,6,7,12-hexahydroindolo[2,3-a]quinolizine in 100 ml. of THF was added dropwise 20 ml. of acrolein (CH₂=CHCHO)

in 50 ml. of benzene over a 15-minute period. After about 30 minutes solid began to form. Stirring was continued 3 hours at room temperature (about 23° C.), then the product was collected, washed with a little benzene and ether and air dried. Yield 22.8 g. M.P. 183–185° C.

For analysis, a sample was recrystallized once from chloroform and once from acetone; M.P. 186–187° C. The infrared spectrum (KCl) showed no C=O absorption. The ultraviolet spectrum (methanol, neutral) showed maxima at 217 sh., 232 (21,800), 315 mμ (18,200). The n.m.r. spectrum (10% DMSO) showed no indole N—H signal; four protons were present at τ2.3–3.6; two protons at τ4.05; shaking with heavy water to exchange O—H left 1 proton peak at τ3.92

*Analysis.*—Calc'd for C₁₈H₂₀N₂O (percent): C, 77.10; H, 7.19; N, 10.00. Found (percent): C, 76.54; H, 7.07; N, 10.03.

EXAMPLE II 1,12-(γ-methoxy)trimethylene-1,2,3,4,6,7,12,12b-octahydroindolo[2,3-a]quinolizine (A) 1,12-(γ-methoxy)trimethylene - 1,2,3,4,6,7,12,12b-octahydroindolo[2,3-a]quinolizine hydrochloride.—A 10.0 g. sample of 1,12-(γ-hydroxy)trimethylene-2,3,4,6,7,12-hexahydroindolo[2,3-a]quinolizine (R=R¹=R²=H) was dissolved in 100 ml. of methanol and then treated with 15 ml. of a 3.2 N solution of HCl in isopropyl alcohol. A catalyst (PtO₂, 0.2 g.) was added and the mixture was hydrogenated at 50 p.s.i. and room temperature. The hydrogenation was complete (1 mole-equiv. uptake) in about 1 hour. The catalyst was filtered and the filtrate concentrated in vacuo to give 11.0 g. of light yellow salt. Recrystallization from methanol-ethyl acetate with the aid of charcoal gave 7.5 g. of white salt, M.P. 258–260° C. (sweating at ca. 200° C.).

*Analysis.*—Calcd. for C₁₉H₂₄N₂O·HCl (percent): N, 8.41; HCl, 10.96. Found (percent): N, 8.46 (Kjeldahl); HCl, 10.83.

(B) 1,12 - (γ-methoxy)trimethylene - 1,2,3,4,6,7,12,12b-octahydroindolo[2,3 - a]quinolizine.—A sample of the above salt was dissolved in water, the solution extracted with ether and the aqueous phase made basic with NaHCO₃. A white crystalline solid was collected and washed with water, M.P. 126–128° C.,

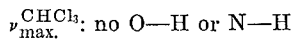

sharp band at 2755 cm.⁻¹. For analysis a sample was recrystallized from pentane-ether; M.P. 129–130° C.

*Analysis.*—Calcd. for C₁₉H₂₄N₂O (percent): C, 76.99; H, 8.17; N (basic), 4.73; N (total), 9.45. Found (percent): C, 76.99; H, 8.12; N (basic), 4.77; N (total), 9.36 (Kjeldahl).

Note: The Dumas method failed to pick up all the nitrogen in the free base and its salt.

EXAMPLE III 1,12-(γ-hydroxy)trimethylene-1,2,3,4,6,7,12,12b-octahydroindolo[2,3-a]quinolizine An 18.1 g. sample of 1,12-(γ-hydroxy)trimethylene-2,3,4,6,7,12 - hexahydroindolo[2,3 - a]quinolizine (0.064 mole) was dissolved in 125 ml. of 2-propanol, 25 ml. of 3.2 N solution of HCl in isopropyl alcohol and 50 ml. H₂O. PtO₂, 0.3 g., was added and the mixture was hydrogenated at 50 p.s.i., at room temperature. The hydrogenation was complete in about 1 hour (1 mole-equiv. uptake). The catalyst was filtered and the filtrate concentrated in vacuo. The residue was dissolved in 1500 ml. of hot water, the solution filtered, then neutralized with 20% NaOH solution. The precipitated product was collected, washed with water and dried. Yield 17.0 g., M.P. 200–205° C.;

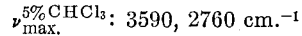

An analytical sample was prepared by recrystallization from benzene-acetone-ether (clarification by charcoal); M.P. 206–207° C.

*Analysis.*—Calcd. for C₁₈H₂₂N₂O (percent): C, 76.59; H, 7.86; N, 9.92. Found (percent): C, 76.37; H, 7.78; N, 9.99.

The product was recrystallized twice from acetone, M.P. 211–212° C. The n.m.r. spectrum (10% dimethyl sulfoxide) showed signals due to four aromatic protons at τ2.5–3.2. Signals at τ=3.81 and 3.89 can be attributed to

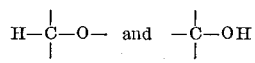

respectively.

EXAMPLE IV 1,12-(γ-oxo)trimethylene-1,2,3,4,6,7,12,12b-octahydroindolo[2,3-a]quinolizine For this example a chromic acid reagent was made up as follows: 26.7 g. CrO₃ and 23 ml. conc. H₂SO₄ made up to 100 ml. volume (=267 mg./ml. CrO₃).

(A) 1,12-(γ-oxo)trimethylene - 1,2,3,4,6,7,12,12b-octahydroindolo[2,3-a]quinolizine.—A 15.0 ml. aliquot of the reagent was added to 7.07 g. of 1,12-(γ-hydroxy)trimethylene - 1,2,3,4,6,7,12,12b - octahydroindolo[2,3-a]quinolizine in 900 ml. of acetone at 10° C. The mixture was stirred at between 10° and 15° C, for 10 minutes, then 100 ml. of water was added. After stirring 10 minutes longer, a solution of 30 g. of Na₂CO₃ in 100 ml. of H₂O was added. The inorganic salts were filtered, the filtrate was concentrated in vacuo and the residue extracted with CHCl₃. Drying and conc. in vacuo gave 2.4 g. of light green amorphous solid;

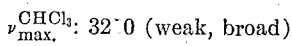: 32 0 (weak, broad)

1700 (intensity 0.56); 1650 (intensity 0.33) (baseline 0.06).

Chromatography of a 2.3 g. sample of the crude material on 150 g. of Florisil gave 1.0 g. of syrup (CHCl₃ eluent) which soon crystallized. Recrystallization of this material from ether-acetone (charcoal treatment) gave white crystals, M.P. 142–143° C.;

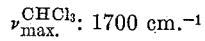: 1700 cm.⁻¹ n.m.r. (10% CHCl₃); three aromatic protons at τ=2.5–2.9; one aromatic proton (deshielded by C=O) at τ=1.53 (position 7 of indole ring).

*Analysis.*—Calcd. for C₁₈H₂₀N₂O (percent): C, 77.10; H, 7.19; N, 5.00 (basic); N, 10.00 (total). Found (percent): C, 76.76; H, 7.27; N, 5.00 (basic); N, 10.17 (total).

(B) 1,12 - (γ - oxo)trimethylene - 1,2,3,4,6,7,12,12b-octahydroindolo[2,3 - a]quinolizine maleate.—A 3.65 g. sample of 1,12-(γ - oxo)trimethylene-1,2,3,4,6,7,12,12b-octahydroindolo[2,3-a]quinolizine was dissolved in a minimal amount of acetone and treated with 1 mole-equivalent of maleic acid in acetone. White crystals soon formed. After cooling, the salt was collected, washed with acetone and ether and dried overnight in the Abderhalden drying apparatus at 60°, yield 4.40 g., M.P. 185–186° C.

*Analysis.*—Calcd. for C₁₈H₂₀N₂O·(CHCO₂H)₂ (percent): N (basic), 3.53; N (total), 7.06. Found (percent): N (basic), 3.50; N (total), 7.11.

EXAMPLE V 1,12-(β-methyl - γ - hydroxy)trimethylene - 2,3,4,6,7,12-hexahydroindolo - [2,3-a]quinolizine (R=R²=H; R¹=CH₃)

To a solution of 22.4 g. (0.10 mole) of 2,3,4,6,7,12-hexahydro-[2,3-a]quinolizine in 200 ml. of dry THF was added dropwise a solution of 15 ml. of 90% technical methacrolein (CH₂:C(CH₃)·CHO) in 50 ml. of benzene. No exothermic reaction was observed. The solution was stirred an additional hour, then allowed to stand at room temperature overnight. The solution was filtered through a sintered glass funnel and the filtrate was concentrated in vacuo. The residue was stirred with ether and the resulting solid collected to give 24.2 g. of tan powder, M.P. 165–170° C.;

$\nu_{max.}^{5\% \ CHCl_3}$: 3590 (free OH), 3350 (bonded OH) and 1640

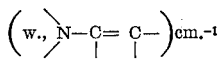cm.⁻¹

There was no indole N—H and no carbonyl absorption. For analysis a sample was recrystallized from acetone-ether; M.P. 169–171° C. (turning dark at 160°).

*Analysis.*—Calcd. for C₁₉H₂₂N₂O (percent): C, 77.55; H, 7.54; N, 9.52. Found (percent): C, 76.96; H, 7.38; N, 9.39.

EXAMPLE VI 1,12-(β-methyl-γ-methoxy)trimethylene-1,2,3,4,6,7,12,12b-octahydroindolo[2,3-a]quinolizine (A) 1,12-(β-methyl-γ-methoxy)trimethylene - 1,2,3,4,6,7,12,12b - octahydroindolo[2,3 - a]quinolizine hydrochloride.—A solution of 5.88 g. of 1,12-(β-methyl-γ-hydroxy)trimethylene - 2,3,4,6,7,12 - hexahydroindolo[2,3-a]quinolizine in 100 ml. of methanol containing 3 g. of hydrogen chloride and 0.2 g. PtO₂ was shaken on the Parr hydrogenator at 50 p.s.i., room temperature. After 4 hours, ca. half the theoretical amount of hydrogen had been taken up and further uptake was very slow. The catalyst was filtered, fresh catalyst (0.2 g.) was added to the filtrate and the total volume was brought to 200 ml. After a few hours shaking the theoretical amount of hydrogen was taken up. The catalyst was filtered and the filtrate concentrated in vacuo. The residual syrup was stirred with ether-methanol to induce crystallization. The hydrochloride was collected and recrystallized from ether-methanol using Nuchar. After 2-hours drying in an Abderhalden drying apparatus at 60° C., the M.P. was 269–271° C., yield, 2.78 g.

*Analysis.*—Calcd. for C₂₀H₂₆N₂O·HCl (percent): HCl, 10.52; N, 8.07. Found (percent): HCl, 10.67; N, 7.88.

(B) 1,12-(β-methyl-γ-methoxy)trimethylene - 1,2,3,4-6,7,12,12b - octahydroindolo[2,3-a]quinolizine.—A sample of 1,12-(β-methyl-γ-methoxy)trimethylene - 1,2,3,4-6,7,12,12b - octahydroindolo[2,3 - a]quinolizine hydrochloride was dissolved in cold water and treated with NaHCO₃ to generate the free base. The organic material was extracted into CHCl₃. The extract was dried and conc. in vacuo to give a yellow glass-like material;

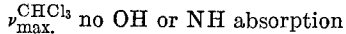 no OH or NH absorption weak spike at 1620 cm.⁻¹.

EXAMPLE VII 1,12-(β-methyl-γ-hydroxy)trimethylene-1,2,3,4,6,7,12,12b-octahydroindolo[2,3-a]quinolizine (A) 1,12-(β-methyl-γ-hydroxy)trimethylene - 1,2,3,4-6,7,12,12b - octahydroindolo[2,3 - a]quinolizine hydrochloride.—To a solution of 8.04 g. of 1,12-(β-methyl-γ-hydroxy)trimethylene - 2,3,4,6,7,12 - hexahydroindolo-[2,3-a]quinolizine in 125 ml. of isopropyl alcohol, 15 ml. of a 2.8 N solution of HCl in isopropyl alcohol and 75 ml. of water was added 0.3 g. PtO₂. The mixture was hydrogenated at 50 p.s.i., room temperature. The theoretical quantity of hydrogen was taken up within about one hour. The catalyst was filtered and the solvent removed in vacuo. To the residue was added ca. 200 ml. of water. The insoluble hydrochloride was collected, washed with a little water and acetone. The product was dried for 1 day at 100° C. in an Abderhalden drying apparatus. Yield 3.88 g., M.P. 272–275° C. (dec.)

*Analysis.*—Calcd. for C₁₉H₂₄N₂O·HCl (percent): HCl, 10.96; N, 8.41. Found (percent): HCl, 11.02; N, 8.47.

(B) 1,12-(β-methyl-γ-hydroxy)trimethylene - 1,2,3,4-6,7,12,12b - octahydroindolo[2,3-a]quinolizine.—A 24.2 g. sample of 1,12-(β-methyl - γ - hydroxy)trimethylene-2,3,4,6,7,12 - hexahydroindolo[2,3-a]quinolizine was dissolved in 50 ml. a 2.2 N solution of HCl in isopropyl alcohol, 100 ml. isopropyl alcohol and 80 ml. H₂O. PtO₂ catalyst (0.3 g.) was added and the mixture hydrogenated as above. After filtration of the catalyst and concentration of the filtrate, an aqueous suspension of the hydrochloride was treated with excess 20% NaOH. The libertaed free base was extracted into CHCl₃. The extract was dried and concentrated in vacuo and the residue stirred in ether to cause crystallization. Yield 12.9 g., M.P. 175–180° C. (probably a mixture of geometrical isomers). Two recrystallizations from acetone-ether gave analytically pure material, M.P. 201–202° C.;

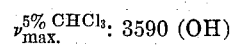: 3590 (OH)

no indole N—H.

*Analysis.*—Calcd. for C₁₉H₂₄N₂O (percent): C, 76.99; H, 8.17; N, 9.45. Found (percent): C, 77.25; H, 8.24; N, 9.22.

EXAMPLE VIII 1,12 - (α - methyl - γ - hydroxy)trimethylene-2,3,4,6,7,12-hexahydroindolo [2,3 - a]quinolizine (R=R¹=H; R²=CH₃)

To a solution of 11.2 g. (0.050 mole) of 2,3,4,6,7,12-hexahydroindolo[2,3-a]quinolizine in 100 ml. of dry THF was added a solution of 12 ml. of crotonaldehyde (CH₃·CH:CH·CHO) in 50 ml. of benzene over a 10 minute period. A slight exothermic reaction was observed. The solution was stirred at room temperature for about 1 hour, then allowed to stand overnight. The reaction mixture was filtered and the filtrate concentrated in vacuo. The residue was stirred with ether to give 9.3 g. of tan solid, M.P. 155–160° C. Two recrystallizations from acetone (clarification with Nuchar) gave the analytical sample, M.P. 165°–166° C.;

$\nu_{max.}^{5\%CHCl_3}$: 3590 (OH), 1640 (w.)

$\lambda_{max.}^{MeOH}$: 213 ($\epsilon$ 10,500)

245 ($\epsilon$ 10,000), sh. 328 ($\epsilon$ 11,000) and 353 m$\mu$ ($\epsilon$ 12,800). The n.m.r. spectrum (10% dimethyl sulfoxide) showed four protons at 2.33 to 3.24 (aromatic) and two protons at 3.94 p.p.m.

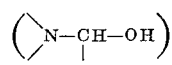

*Analysis.*—Calcd. for C₁₉H₂₂N₂O (percent): C, 77.51; H, 753; N, 9.52. Found (percent): C, 77.52; H, 7.65; N, 9.45.

EXAMPLE IX 1,12-($\beta$-methyl-$\gamma$-oxo)trimethylene-1,2,3,4,6,7,12,12b-octahydroindolo[2,3-a]quinolizine To a stirred solution of 21.1 g. (0.07 mole) of 1,12-($\beta$-methyl - $\gamma$ - hydroxy)trimethylene-1,2,3,4,6,7,12,12b-octahydroindolo[2,3-a]quinolizine in 1500 ml. of acetone at about 10° C. was added 50 ml. of the chromic acid reagent prepared in Example IV. The temperature was maintained at about 10° C. during the addition after which the mixture was stirred at between about 5 and 10° C. for 1 hour. Anhydrous K₂CO₃ (120 g.) was slowly added as the mixture was stirred vigorously. After stirring for 30 minutes the insoluble salts were filtered. The filtrate was dried over MgSO₄, then concentrated in vacuo to give a light green residue. The residue was dissolved in CHCl₃ and chromatographed on 200 g. of Florisil. Elution with CHCl₃ (2 l.) gave 2.2 g. of material. The maleate was prepared from the free base above in acetone-ether solution; yield 1.2 g., M.P. 145–147° C. The free base was regenerated in NaHCO₃ solution and extracted into CHCl₃. The extract was dried and concentrated in vacuo and the residual solid was recrystallized from acetone to give the hydrated product, M.P. 175–180° C.;

$\nu_{max.}^{KCl}$: 1710 cm.⁻¹ (C=O)

*Analysis.*—Calcd. for C₁₉H₂₂N₂O·H₂O (percent): C, 73.10; H, 7.75; N, 8.98; O, 10.25. Found (percent): C, 73.71; H, 7.34; N, 9.27; O, 10.23.

EXAMPLE X (A) *Methyl benzylidenepyruvate.*—Anhydrous hydrogen chloride was bubbled into a solution of 16.5 g. benzylidenepyruvic acid in 200 ml. of methanol until the temperature reached about 70° C. The methanol was distilled in vacuo and the residual yellow solid was dissolved in 500 ml. of ether. The solution was shaken with saturated NaHCO₃ solution and water to remove traces of acid. The ethereal phase was dried over MgSO₄ and concentrated in vacuo. The residue was stirred with a little pentane and the resulting yellow crystalline solid was collected and dried. Yield 15.2 g., M.P. 65–70° C.;

$\nu_{max.}^{CHCl_3}$: 1745 (ester C=O)

1695 (ketone C=O), 1670 (ketone C=O), 1610 (C=C, conj.), 1580 (aromatic) cm.⁻¹.

(B) 1,12 - ($\alpha$-phenyl - $\gamma$-carbomethoxy-$\gamma$-hydroxy)trimethylene - 2,3,4,6,7, - 12-hexahydroindolo[2,3-a]quinolizine.—A solution of 15.2 g. (0.0792 mole) of methyl benzylidenepyruvate in 60 ml. of benzene was added to a stirred solution of 17.7 g. (0.0792 mole) of 2,3,4,6,7,12-hexahydroindolo[2,3-a]quinolizine in 100 ml. of dry THF over a 20-minute period. The temperature climbed to 34° C. during the addition. The reaction mixture was stirred for 1 hour after which the dark solution was warmed and treated with Nuchar. The clarified filtrate was concentrated in vacuo and the residue stirred with ether to give 20.7 g. of tan solid, M.P. 110–112° C. (dec.);

$\nu_{max.}^{CHCl_3}$: 3520 (OH), 1730 (ester C=O), 1625 (w., $-\overset{|}{\text{N}}-\overset{|}{\text{C}}=\overset{|}{\text{C}}$), 1600 (aromatic) cm.⁻¹

An analytical sample was prepared by recrystallization from a minimal amount of acetone; M.P. 113–114° C.

*Analysis.*—Calcd. for C₂₆H₂₆N₂O₃ (percent): C, 75.33; N, 6.32; N, 6.76. Found (percent): C, 74.87; H, 6.16; N, 6.77 (Kjeldahl). Ultraviolet spectrum:

$\lambda_{max.}^{MeOH}$ neut.: 210 ($\epsilon$ 51,000)

sh. 229 ($\epsilon$ 27,800) and 304 m$\mu$ ($\epsilon$ 26,400).

EXAMPLE XI 1,12 - ($\alpha$-phenyl-$\gamma$-carbomethoxy-$\gamma$-hydroxy)trimethylene-1,2,3,4,6,7,12,12b - octahydroindolo[2,3-a]quinolizine oxalate An 8.07 g. sample of 1,12-($\alpha$-phenyl-$\gamma$-carbomethoxy)-$\gamma$ - hydroxy)trimethylene - 2,3,4,6,7,12-hexahydroindolo[2,3-a]quinolizine was dissolved in 50 ml. of water and 175 ml. of isopropyl alcohol containing 25 ml. of a 2 N solution of HCl in isopropyl alcohol. Catalyst (0.3 g. PtO₂) was added and the mixture was hydrogenated on a Parr shaker at 50 p.s.i. at room temperature. After 2 hours the hydrogenation was complete; the catalyst was filtered and the filtrate concentrated in vacuo at 35° C. The residue was shaken with a mixture of NaHCO₃ solution and CHCl₃. The organic extract was dried and concentrated in vacuo and the residue (5.7 g.) chromatographed on 100 g. of Florisil. Elution with 1 l. of acetone gave 3.4 g. of semi-solid material. The crude free base was dissolved in 100 ml. of ether, insoluble material was filtered and the filtrate was treated with 0.8 g. of oxalic acid in ether. The salt was collected, washed with ether and dried in Abderhalden drying apparatus at 60° C.; yield 3.6 g., M.P. 130–150° C. An infrared spectrum (CHCl₃) of the free base showed both NH and OH absorption (3470, 3520 cm.⁻¹) indicating a mixture of cyclic and ring-opened tautomers.

*Analysis.*—Calcd. for C₂₆H₂₈N₂O₃·(CO₂H)₂ (percent): N (basic), 2.76; N (total), 5.53. Found (percent): N (basic), 2.71; N (total), 5.66.

EXAMPLE XII 1,12 - ($\gamma$ - isopropoxy)trimethylene - 1,2,3,4,6,7,12,12b-octahydroindolo[2,3 - a]quinolizine hydrochlorilde (R=R¹=R²=H; R³=OCH(CH₃)₂)

A 10.7 g. sample of 1,12-($\gamma$-hydroxy)trimethylene-2,3,4,6,7,12-hexahydroindolo[2,3-a]quinolizine was dissolved in 170 ml. of isopropyl alcohol and 30 ml. of 2 N solution of hydrogen chloride in isopropyl alcohol. Catalyst (0.3 g. PtO₂) was added and the mixture was shaken on the Parr hydrogenator at 50 p.s.i., 25° C. After 2 hr. the required amount of hydrogen had been taken up. Additional isopropyl alcohol was added and the mixture was heated in order to dissolve some precipitated salt. After removal of catalyst the solvent was concentrated in vacuo and the residue was stirred in warm ether and isopropyl alcohol. Yield 8.50 g., M.P. 176–178° C. (dec.). The product was recrystallized from ether-isopropyl alcohol and dried in an Abderhalden drying apparatus for 2 days at 60° C. Yield 5.0 g., M.P. 181–182° C. (dec.).

*Analysis.*—Calcd. for $C_{21}H_{28}N_2O \cdot HCl$ (percent): C, 69.88; H, 8.09; HCl, 10.11. Found (percent): C, 69.37; H, 8.08; HCl, 9.93.

The various compounds described in the above examples are shown in Table 1 with their physical and chemical characteristics

TABLE 1

| Example No. | Chemical Name and Structure | M.P., °C. | Formula |
|---|---|---|---|
| 1 | 1,12-(γ-hydroxy)trimethylene-2,3,4,6,7,12-hexahydroindolo[2,3-a]quinolizine. | 183–185 | $C_{18}H_{20}N_2O$ |
| 2 | 1,12-(γ-methoxy)trimethylene-1,2,3,4,6,7,12,12b-octahydroindolo[2,3-a]quinolizine. | 129–130 | $C_{19}H_{24}N_2O$ |
| 3 | 1,12-(γ-hydroxy)trimethylene-1,2,3,4,6,7,12,12b-octahydroindolo[2,3-a]quinolizine. | 206–207 | $C_{18}H_{22}N_2O$ |
| 4 | 1,12-(γ-oxo)trimethylene-1,2,3,4,6,7,12,12b-octahydroindolo[2,3-a]quinolizine. | 142–143 | $C_{18}H_{20}N_2O$ |
| 5 | 1,12-(β-methyl-γ-hydroxy)trimethylene-2,3,4,6,7,12-hexahydroindolo[2,3-a]quinolizine. | 169–171 | $C_{19}H_{22}N_2O$ |
| 6 | 1,12-(β-methyl-γ-methoxy)trimethylene-1,2,3,4,6,7,12,12b-octahydroindolo[2,3-a]quinolizine hydrochloride. | 269–271 | $C_{20}H_{26}N_2O \cdot HCl$ |

TABLE 1—Continued

| Example No. | Chemical Name and Structure | M.P., °C. | Formula |
|---|---|---|---|
| 7 | 1,12-(β-methyl-γ-hydroxy)trimethylene-1,2,3,4,6,7,12,12b-octahydroindolo[2,3-a]quinolizine. | 201-202 | $C_{19}H_{24}N_2O$ |
| 8 | 1,12-(α-methyl-γ-hydroxy)trimethylene-2,3,4,6,7,12-hexahydroindolo[2,3-a]quinolizine. | 165-166 | $C_{19}H_{20}N_2O$ |
| 9 | 1,12-(β-methyl-γ-oxo)trimethylene-1,2,3,4,6,7,12,12b-octahydroindolo[2,3-a]quinolizine hydrate. | 175-180 | $C_{19}H_{22}N_2O \cdot H_2O$ |
| 10 | 1,12-(α-phenyl-γ-carbomethoxy-γ-hydroxy)trimethylene-2,3,4,6,7,12-hexahydroindolo[2,3-a]quinolizine. | 113-114 | $C_{26}H_{26}N_2O_3$ |
| 11 | 1,12-(α-phenyl-γ-carbomethoxy-γ-hydroxy)trimethylene-1,2,3,4,6,7,12,12b-octahydroindolo[2,3-a]quinolizine oxalate. | 130-150 | $C_{26}H_{28}N_2O_3(CO_2H)_2$ |
| 12 | 1,12-(γ-isopropoxy)trimethylene-1,2,3,4,6,7,12,12b-octahydroindolo[2,3-a]hydrochloride. | 181-182 | $C_{21}H_{28}N_2O \cdot HCl$ |

Medications may be conveniently prepared with an octahydro-1,12-trimethyleneindolo[2,3-a]quinolizine as an active ingredient using fillers, carriers, extenders and/or excipients generally used in pharmaceutical formulations. The active ingredient may be in the form of the free base and is preferable in the form of a pharmacologically acceptable, non-toxic, water-soluble addition salt. Medications may be prepared in solid or liquid states as tablets, capsules, suspensions, and similar forms. The free base or acid addition salt may be mixed with common diluents or tabletting adjuncts such as cellulose powder, cornstarch, lactose, talc, etc. according to accepted manufacturing practices.

What is claimed is:

1. A compound selected from the group consisting of compounds of the formula:

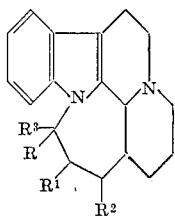

in which R is a member selected from the group consisting of hydrogen and carboloweralkoxy, R³ is a member selected from the group consisting of hydroxy, methoxy and isopropoxy, or RR³ is oxo, R¹ is a member selected from the group consisting of hydrogen and lower alkyl, and R² is a member selected from the group consisting of hydrogen, lower alkyl and phenyl, and pharmacologically acceptable salts of said compounds.

2. A compound of claim 1 which is 1,12-(γ-methoxy)-trimethylene - 1,2,3,4,6,7,12,12b - octahydroindolo[2,3-a]-quinolizine.

3. A compound of claim 1 which is 1,12-(γ-hydroxy)-trimethylene - 1,2,3,4,6,7,12,12b - octahydroindolo[2,3-a]quinolizine.

4. A compound of claim 1 which is 1,12-(β-methyl-γ-hydroxy)trimethylene-1,2,3,4,6,7,12,12b-octahydroindolo-[2,3-a]quinolizine.

5. A compound of claim 1 which is 1,12-(γ-oxo)tri-methylene - 1,2,3,4,6,7,12,12b - octahydroindolo[2,3 - a]-quinolizine.

6. A compound of claim 1 which is 1,12-(γ-isopropoxy)trimethylene - 1,2,3,4,6,7,12,12b - octahydroindolo-[2,3-a]quinolizine.

7. A compound of claim 1 which is 1,12-(β-methyl-γ-methoxy)trimethylene - 1,2,3,4,6,7,12,12b - octahydroindolo[2,3-a]quinolizine.

8. A compound of claim 1 which is 1,12-(β-methyl-γ-oxo)trimethylene - 1,2,3,4,6,7,12,12b - octahydroindolo-[2,3-a]quinolizine.

9. A compound of claim 1 which is 1,12-(α-phenyl-γ-carbomethoxy - γ - hydroxy)trimethylene - 1,2,3,4,6,7, 12,12b-octahydroindolo[2,3-a]quinolizine.

10. A process for the preparation of a compound of claim 1 selected from the group consisting of compounds of the formula:

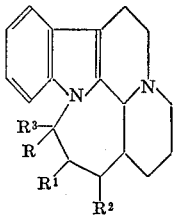

in which R is a member selected from the group consisting of hydrogen and carboloweralkoxy, R³ is a member selected from the group consisting of hydroxy, methoxy, and isopropoxy, R¹ is a member selected from the group consisting of hydrogen and lower alkyl, and R² is a member selected from the group consisting of hydrogen, lower alkyl and phenyl which comprises reacting a compound of the formula:

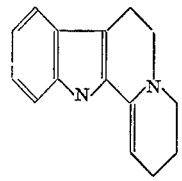

with a compound of the formula:

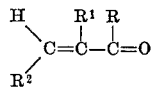

to form an adduct of the formula:

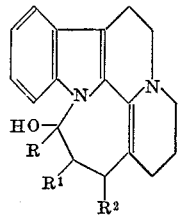

and hydrogenating the resulting adduct in the presence of a solvent selected from the group consisting of methanol, isopropyl alcohol, and water to form the desired product having the formula:

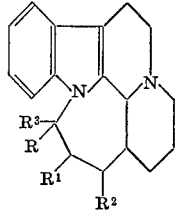

References Cited

Bartlett et al., J. Am. Chem. Soc., vol. 82, pp. 5941–6 (1960).

HENRY R. JILES, Primary Examiner

ALAN L. ROTMAN, Assistant Examiner

U.S. Cl. X.R.

260—295, 296; 424—263, 266